United States Patent
Chan et al.

(10) Patent No.: US 11,496,233 B2
(45) Date of Patent: Nov. 8, 2022

(54) COMMUNICATION SYSTEM AND COMMUNICATION METHOD FOR ONE-WAY TRANSMISSION

(71) Applicant: BlackBear (Taiwan) Industrial Networking Security Ltd., Hsinchu (TW)

(72) Inventors: Yuan Chen Chan, Hsinchu (TW); Po-Hao Su, Hsinchu (TW); Po-Chih Hsu, Changhua County (TW)

(73) Assignee: BlackBear (Taiwan) Industrial Networking Security Ltd., Hsinchu (TW)

( * ) Notice: Subject to any disclaimer, the term of this patent is extended or adjusted under 35 U.S.C. 154(b) by 0 days.

(21) Appl. No.: 17/195,530

(22) Filed: Mar. 8, 2021

(65) Prior Publication Data

US 2022/0200720 A1      Jun. 23, 2022

Related U.S. Application Data

(60) Provisional application No. 63/129,594, filed on Dec. 23, 2020.

(51) Int. Cl.
  *H04J 3/06* (2006.01)
(52) U.S. Cl.
  CPC ............ *H04J 3/0664* (2013.01); *H04J 3/065* (2013.01); *H04J 3/0644* (2013.01); *H04J 3/0673* (2013.01)
(58) Field of Classification Search
  USPC ........................................................ 370/503
  See application file for complete search history.

(56) References Cited

U.S. PATENT DOCUMENTS

| 5,703,562 A | 12/1997 | Nilsen |
| 7,649,452 B2 | 1/2010 | Zilberstein et al. |
| | (Continued) | |

FOREIGN PATENT DOCUMENTS

| TW | 202025808 | 7/2020 |
| TW | 202029720 | 8/2020 |
| | (Continued) | |

OTHER PUBLICATIONS

"Search Report of Europe Counterpart Application", dated Oct. 28, 2021, p. 1-p. 10.

(Continued)

*Primary Examiner* — Gregory B Sefcheck
*Assistant Examiner* — Majid Esmaeilian
(74) *Attorney, Agent, or Firm* — JCIPRNET

(57) ABSTRACT

A communication system and a communication method for one-way transmission are provided. The communication method includes: receiving, by a precision time protocol switch, a first synchronization message from a grandmaster clock; generating, by the precision time protocol switch, a second synchronization message according to the first synchronization message; transmitting, by the precision time protocol switch, the second synchronization message to a transmitting server and a programmable logic device; generating, by the transmitting server, a timestamp according to the second synchronization message; transmitting, by the transmitting server, at least one data packet and the timestamp to the precision time protocol switch; forwarding, by the precision time protocol switch, the at least one data packet and the timestamp to the programmable logic device; and determining, by the programmable logic device, whether to output the at least one data packet according to the timestamp and the second synchronization message.

14 Claims, 5 Drawing Sheets

(56) References Cited

U.S. PATENT DOCUMENTS

| | | | |
|---|---|---|---|
| 8,250,235 | B2 | 8/2012 | Harvey et al. |
| 8,250,358 | B2 | 8/2012 | Cheng |
| 8,352,450 | B1 | 1/2013 | Mraz et al. |
| 8,353,022 | B1 | 1/2013 | Menoher et al. |
| 8,732,453 | B2 | 5/2014 | Mraz et al. |
| 8,776,254 | B1 | 7/2014 | Mraz et al. |
| 8,891,546 | B1 | 11/2014 | Frenkel et al. |
| 8,893,253 | B2 | 11/2014 | Cianfrocca |
| 9,088,558 | B2 | 7/2015 | Curry et al. |
| 9,306,953 | B2 | 4/2016 | Mraz et al. |
| 9,521,120 | B2 | 12/2016 | Ferry |
| 9,584,521 | B2 | 2/2017 | Frenkel |
| 9,736,121 | B2 | 8/2017 | Mraz et al. |
| 9,749,011 | B2 | 8/2017 | Kim et al. |
| 9,762,536 | B2 | 9/2017 | Frenkel et al. |
| 9,847,972 | B2 | 12/2017 | Frenkel et al. |
| 9,853,918 | B2 | 12/2017 | Mraz et al. |
| 10,218,715 | B2 | 2/2019 | Thomson et al. |
| 2007/0002779 | A1* | 1/2007 | Lee ................ H04W 76/45 370/260 |
| 2009/0006882 | A1* | 1/2009 | Manapragada ........ H04L 7/08 713/600 |
| 2013/0010954 | A1 | 1/2013 | Falk et al. |
| 2013/0329731 | A1* | 12/2013 | Gabriel ............ H04L 45/308 370/392 |
| 2016/0170439 | A1* | 6/2016 | Aweya ............... H04L 69/28 713/401 |
| 2016/0218975 | A1* | 7/2016 | Hyoudou ......... H04L 45/7453 |
| 2016/0339300 | A1* | 11/2016 | Todasco ............ A61B 5/486 |
| 2017/0353368 | A1 | 12/2017 | Blocher et al. |
| 2019/0245690 | A1 | 8/2019 | Shah et al. |
| 2019/0349392 | A1 | 11/2019 | Wetterwald et al. |
| 2020/0053048 | A1 | 2/2020 | Frenkel |
| 2020/0120071 | A1 | 4/2020 | Wimmer et al. |
| 2020/0259585 | A1 | 8/2020 | Aust et al. |
| 2020/0267673 | A1* | 8/2020 | Joseph ............... H04W 76/10 |
| 2020/0295861 | A1 | 9/2020 | Zinner |
| 2020/0342153 | A1 | 10/2020 | Staubly et al. |

FOREIGN PATENT DOCUMENTS

| | | |
|---|---|---|
| TW | M605565 | 12/2020 |
| WO | 2017063450 | 4/2017 |

OTHER PUBLICATIONS

"Notice of allowance of Taiwan Counterpart Application", dated Apr. 11, 2022, p. 1-p. 4.

* cited by examiner

COMMUNICATION SYSTEM AND COMMUNICATION METHOD FOR ONE-WAY TRANSMISSION

CROSS-REFERENCE TO RELATED APPLICATION

This application claims the priority benefit of U.S. provisional application Ser. No. 63/129,594, filed on Dec. 30, 2020. The entirety of the above-mentioned patent application is hereby incorporated by reference herein and made a part of this specification.

BACKGROUND

Technical Field

The disclosure is directed to a communication system and a communication method for one-way transmission.

Description of Related Art

In order to prevent a secure site (or OT: operation technology site) from being attacked by computer virus or hackers from Internet, a one-way transmission technique is normally used for performing a data transmission between the secure site and an unsecure site (or IT: information technology site). A one-way link may limit the direction of signals such that the signals can only be transmitted from the secure site to the unsecure site, and no signals can be transmitted from the unsecure site to the secure site. However, the secure site is not always safe even if a one-way link is implemented between the secure site and the unsecure site. For example, a device in the secure site is easy to be attacked in a firmware upgrading procedure or in a maintenance period. If the device in the secure site has been attacked, the device may transmit needless information such as malicious virus to the unsecure site. Therefore, how to protect devices in the unsecure site from being inflected by devices in the secure site is an important issue to the art.

SUMMARY

Accordingly, the present disclosure is directed to a communication system and a communication method for one-way transmission. The present disclosure may prevent devices in the unsecure site from being inflected by devices in the secure site.

The present invention is directed to a communication system for one-way transmission. The communication system including a one-way link circuit, a grandmaster clock, a transmitting server, and a precision time protocol switch. The one-way link circuit includes a programmable logic device. The precision time protocol switch is coupled to the one-way link circuit, the grandmaster clock, and the transmitting server, wherein the precision time protocol switch receives a first synchronization message from the grandmaster clock, generates a second synchronization message according to the first synchronization message, and transmits the second synchronization message to the transmitting server and the programmable logic device. The transmitting server generates a timestamp according to the second synchronization message and transmits at least one data packet and the timestamp to the precision time protocol switch. The precision time protocol switch forwards the at least one data packet and the timestamp to the programmable logic device. The programmable logic device determines whether to output the at least one data packet according to the timestamp and the second synchronization message.

In an exemplary embodiment of the present invention, the programmable logic device determines whether to output the at least one data packet according to the timestamp and the second synchronization message based on a filtering rule.

In an exemplary embodiment of the present invention, the communication system further including a storage device. The storage device is coupled to the one-way link circuit, wherein the programmable logic device transmits the at least one data packet to the storage device in response to determining not to output the at least one data packet.

In an exemplary embodiment of the present invention, the programmable logic device performs a time synchronization process with the precision time protocol switch according to the second synchronization message.

In an exemplary embodiment of the present invention, the programmable logic device obtains a time offset from the time synchronization process and determines whether to output the at least one data packet according to the time offset and the timestamp.

In an exemplary embodiment of the present invention, the communication system further including a receiving server. The receiving server is coupled to the one-way link circuit, wherein the receiving server receives the second synchronization message, the at least one data packet, and the timestamp from the programmable logic device, wherein the receiving server determines whether the at least one data packet is abnormal according to the timestamp and the second synchronization message.

In an exemplary embodiment of the present invention, the receiving server performs a time synchronization process with the precision time protocol switch according to the second synchronization message.

In an exemplary embodiment of the present invention, the receiving server obtains a time offset from the time synchronization process and determines whether the at least one data packet is abnormal according to the time offset and the timestamp.

In an exemplary embodiment of the present invention, the programmable logic device has a unidirectional mode and a bi-directional mode, wherein the precision time protocol switch communicates with the receiving server for the time synchronization process via the programmable logic device in the bi-directional model, wherein the programmable logic device outputs the at least one data packet in the unidirectional mode.

In an exemplary embodiment of the present invention, a packet format of the at least one data packet includes a proprietary header, and the proprietary header includes a synchronization word and a checksum of the proprietary header, wherein the programmable logic device determines whether to output the at least one data packet according to the timestamp and the proprietary header.

In an exemplary embodiment of the present invention, a packet format of the at least one data packet includes a proprietary header, and the proprietary header includes a synchronization word and a checksum of the proprietary header, wherein the receiving server determines whether the at least one data packet is abnormal according to the timestamp and the proprietary header.

In an exemplary embodiment of the present invention, the packet format is an Ethernet packet format.

In an exemplary embodiment of the present invention, the packet format further including: a type-length-value frame storing at least one of a Hash value corresponding to the Hash method and a destination file name of a file corresponding to the at least one data packet.

In an exemplary embodiment of the present invention, the transmitting server is configured to: receive a signal corresponding to a first protocol and obtains data from the signal; and pack the data to generate the at least one data packet corresponding to a second protocol.

In an exemplary embodiment of the present invention, the first protocol is a bi-directional protocol and the second protocol is a unidirectional protocol.

The present invention is directed to a communication method for one-way transmission, including: receiving, by a precision time protocol switch, a first synchronization message from a grandmaster clock; generating, by the precision time protocol switch, a second synchronization message according to the first synchronization message; transmitting, by the precision time protocol switch, the second synchronization message to a transmitting server and a programmable logic device; generating, by the transmitting server, a timestamp according to the second synchronization message; transmitting, by the transmitting server, at least one data packet and the timestamp to the precision time protocol switch; forwarding, by the precision time protocol switch, the at least one data packet and the timestamp to the programmable logic device; and determining, by the programmable logic device, whether to output the at least one data packet according to the timestamp and the second synchronization message.

In view of foregoing, the present disclosure may implement a one-way transmission channel by a programmable logic device which can filter data packets. No needless information will be sent from the secure site to the unsecure site. Furthermore, the present disclosure may perform time synchronization process for the secure site, the one-way link circuit, and the unsecure site. Obsolete packets may be filtered according to the result of the time synchronization process. Therefore, a sniffer packet from the secure site cannot be sent from the secure site to the unsecure site since the timestamp of the sniffer packet is different from the timestamp of the original packet.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Figure 1:
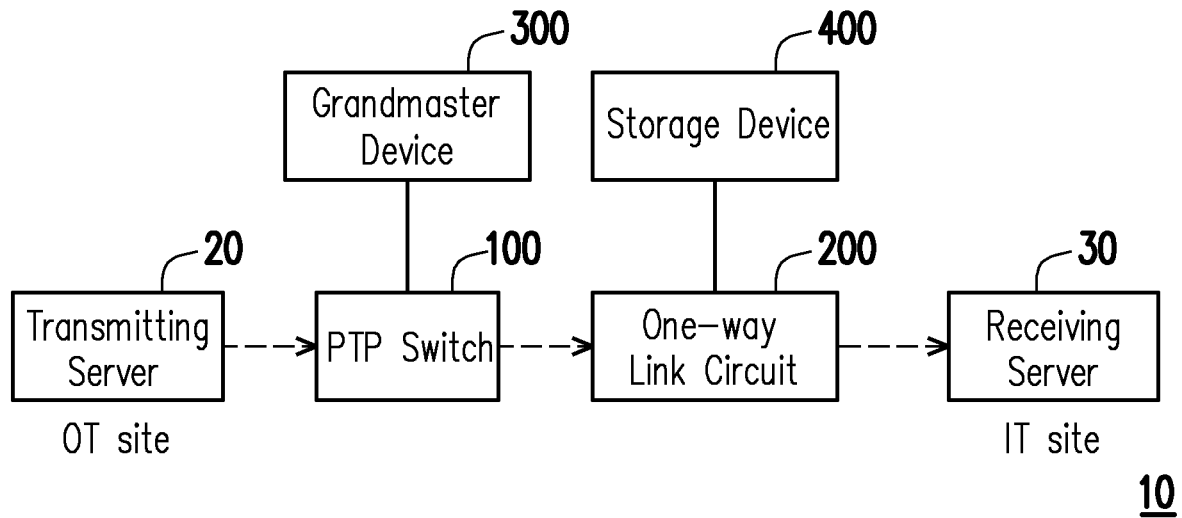
FIG. 1 illustrates a schematic diagram of the communication system for one-way transmission according to an embodiment of the disclosure.

FIG. 1 illustrates a schematic diagram of the communication system 10 for one-way transmission according to an embodiment of the disclosure. The communication system 10 may include a precision time protocol (PTP) switch 100, a one-way link circuit 200, and a grandmaster clock 300. In one embodiment, the communication system 10 may further include a storage device 400, a transmitting server 20 and/or a receiving server 30. The communication system 10 may limit the direction of signals such as the signals can only be transmitted from the transmitting server 20 in the OT site to the receiving server 30 in the IT site. The PTP switch 100 may be coupled to the transmitting server 20, the grandmaster clock 300, and the one-way link circuit 200. The one-way link circuit 200 may be coupled to the PTP switch 100, the storage device 400, and the receiving server 30. In order to enhance the timing precision up to micro-second level or nano-second level, the components of the communication system 10 may be communicatively connected to each other via a cable such as a RJ-45 cable instead of via wireless signal, but the disclosure is not limited thereto.

Figure 2:
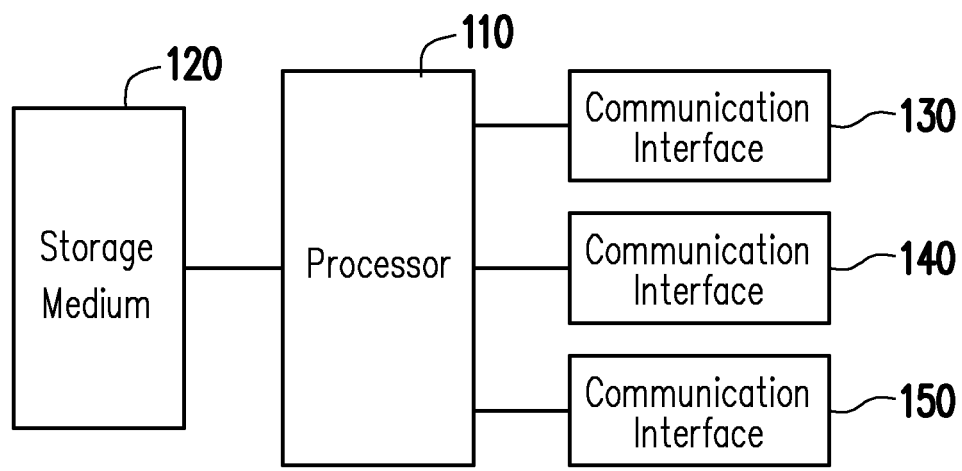
FIG. 2 illustrates a schematic diagram of the router according to an embodiment of the disclosure.

FIG. 2 illustrates a schematic diagram of the PTP switch 100 according to an embodiment of the disclosure. The PTP switch 100 may include a processor 110, a storage medium 120, a communication interface 130, a communication interface 140, and a communication interface 150.

The processor 110 may be, for example, a central processing unit (CPU), a programmable microprocessor, a digital signal processor (DSP), a programmable controller, an application specific integrated circuit (ASIC), a graphics processing unit (GPU), a PLD or other similar elements, or a combination thereof. The processor 110 may be coupled to the storage medium 120, the communication interface 130, the communication interface 140, and the communication interface 150, and may be capable of accessing and executing modules, software, or various applications stored in the storage medium 120.

The storage medium 120 may include, for example, any type of fixed or removable random access memory (RAM), a read-only memory (ROM), a flash memory, a hard disk drive (HDD), a solid state drive (SSD) or similar elements, or a combination thereof, configured to record a plurality of modules or various applications executable by the processor 110.

The communication interface 130 (or 140, 150) may transmit or receive signals wiredly. In one embodiment, the communication 130 (or 140, 150) may be a physical layer (PHY) port which may transmit or receive signal via a cable such as a RJ-45 cable. The PTP switch 100 may communicatively connect to the transmitting server 20 via the communication interface 130, may communicatively connect to the grandmaster clock 300 via the communication interface 140, and may communicatively connect to the one-way link circuit 200 via the communication interface 150.

Figure 3:
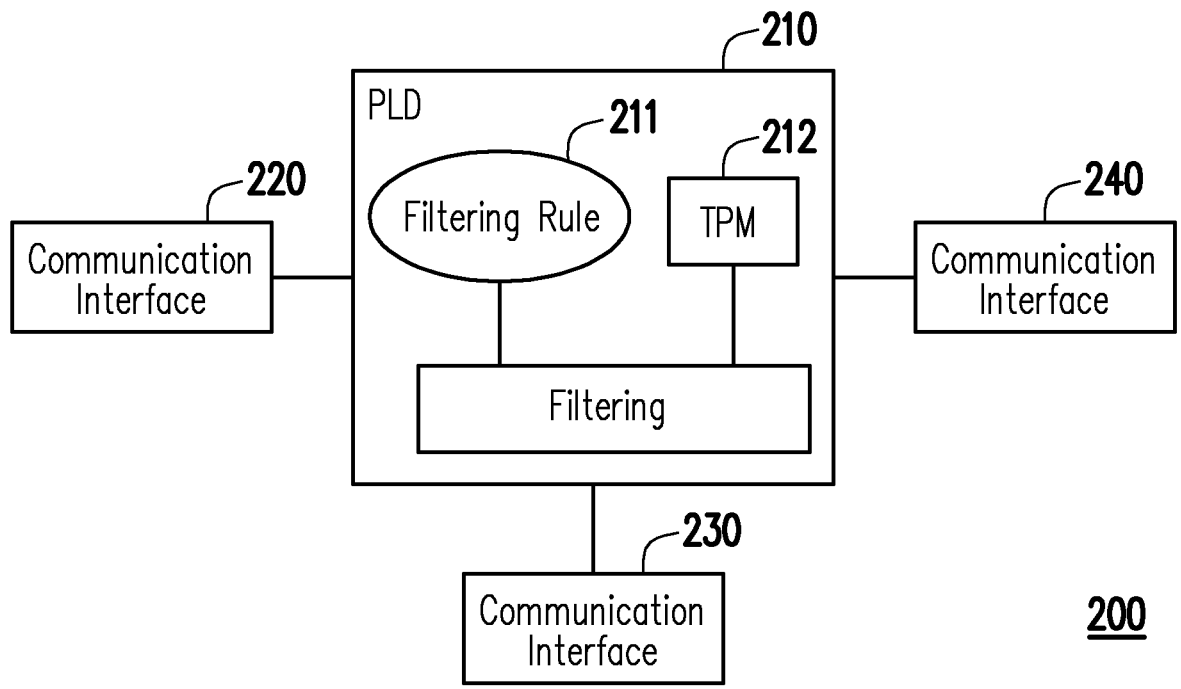
FIG. 3 illustrates a schematic diagram of the one-way link circuit according to an embodiment of the disclosure.

FIG. 3 illustrates a schematic diagram of the one-way link circuit 200 according to an embodiment of the disclosure. The one-way link circuit 200 may include a programmable logic device (PLD) 210, a communication interface 220, a communication interface 230, and a communication interface 240.

The PLD 210 may include, for example, a PAL, a GAL, a CPLD, a FPGA or similar elements, or a combination thereof. The PLD 210 may store a filtering rule 211 and a trusted platform module (TPM) 212. The PLD 210 may communicatively connect to the PTP switch 100 via the communication interface 220, may communicatively connect to the storage device 400 via the communication interface 230, and may communicatively connect to the receiving server 30 via the communication interface 240. The storage device 400 may be, for example, a RAM, A ROM, a flash memory, a HDD, an SSD or a combination of the above components, the disclosure is not limited thereto. The storage device 400 may store the data packet received from the PLD 210 for user reference.

The communication interface 220 (or 230, 240) may transmit or receive signals wiredly. In one embodiment, the communication 220 (or 230, 240) may be a PHY port which may transmit or receive signal via a cable such as a RJ-45 cable.

Figure 4:
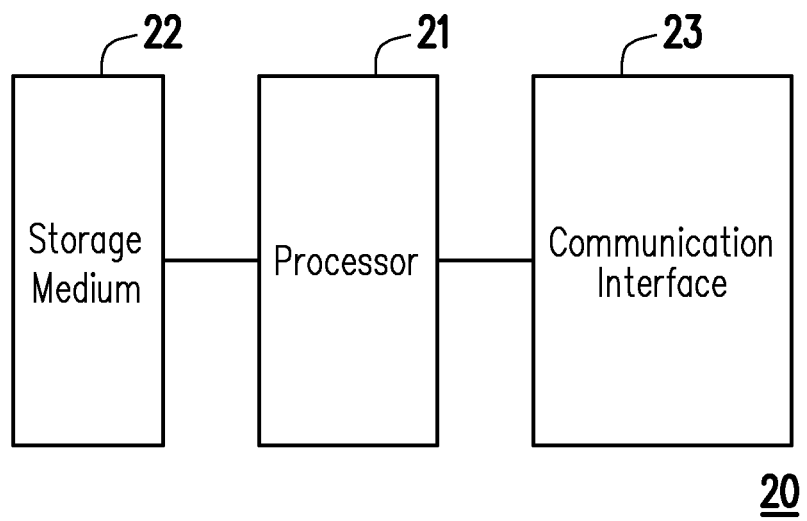
FIG. 4 illustrates a schematic diagram of the transmitting server according to an embodiment of the disclosure.

FIG. 4 illustrates a schematic diagram of the transmitting server 20 according to an embodiment of the disclosure. The transmitting server 20 may include a processor 21, a storage medium 22, and a communication interface 23. The processor 21 may be, for example, a CPU, a programmable microprocessor, a DSP, a programmable controller, an ASIC, a GPU, a PLD or other similar elements, or a combination thereof. The processor 21 may be coupled to the storage medium 22 and the communication interface 23, and may be capable of accessing and executing modules, software, or various applications stored in the storage medium 22. The storage medium 22 may include, for example, any type of fixed or removable RAM, a ROM, a flash memory, a HDD, an SSD or similar elements, or a combination thereof, configured to record a plurality of modules or various applications executable by the processor 21. The communication interface 23 may transmit or receive signals wiredly. In one embodiment, the communication interface 23 may be a PHY port which may transmit or receive signal via a cable such as a RJ-45 cable. The transmitting server 20 may communicatively connect to the PTP switch 100 via the communication interface 23.

Figure 5:
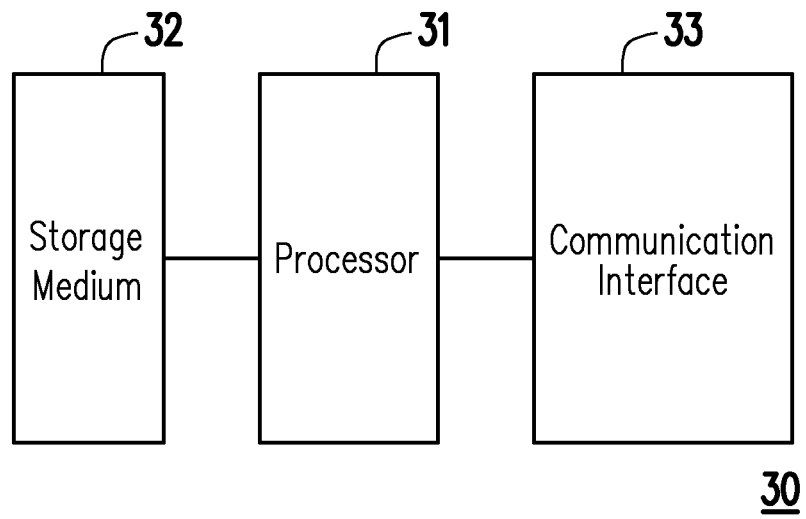
FIG. 5 illustrates a schematic diagram of the receiving server according to an embodiment of the disclosure.

FIG. 5 illustrates a schematic diagram of the receiving server 30 according to an embodiment of the disclosure. The processor 31 may be, for example, a CPU, a programmable microprocessor, a DSP, a programmable controller, an ASIC, a GPU, a PLD or other similar elements, or a combination thereof. The processor 31 may be coupled to the storage medium 32 and the communication interface 33, and may be capable of accessing and executing modules, software, or various applications stored in the storage medium 32. The storage medium 32 may include, for example, any type of fixed or removable RAM, a ROM, a flash memory, a HDD, an SSD or similar elements, or a combination thereof, configured to record a plurality of modules or various applications executable by the processor 31. The communication interface 33 may transmit or receive signals wiredly. In one embodiment, the communication interface 33 may be a PHY port which may transmit or receive signal via a cable such as a RJ-45 cable. The receiving server 30 may communicatively connect to the one-way link circuit 200 via the communication interface 33.

The grandmaster clock 300 may be implemented by a hardware circuit or a software. The grandmaster clock 300 may transmit a first synchronization message to the PTP switch 100, wherein the first synchronization message may be a signal corresponding to PTP or IEEE 1588 protocol. The first synchronization message may be used for performing time synchronization process between the grandmaster clock 300 and the PTP switch 100. The PTP switch 100 may be a boundary clock device. Specifically, the PTP switch 100 may be a slave clock device to the grandmaster clock 300 and may be a master clock device to the transmitting server 20, the receiving server 30, or the one-way link circuit 200. That is, the PTP switch 100 may synchronize with the grandmaster clock 300 according to the first synchronization message outputted from the grandmaster clock 300, and the transmitting server 20 (or the receiving server 30, the one-way link circuit 200) may synchronize with the PTP switch 100 according to a second synchronization message output from the PTP switch 100, wherein the second synchronization message is generated by the PTP switch 100 according to the first synchronization message, and the second synchronization message may be a signal corresponding to PTP or IEEE 1588 protocol.

The one-way link circuit 200 may be a slave clock device to the PTP switch 100 or may be a transparent clock device to the receiving server 30. That is, the one-way link circuit 200 may be synchronized with the PTP switch 100 according to the second synchronization message outputted from the PTP switch 100 or may forward the second synchronization message received from the PTP switch 100 to the receiving server 30.

The PLD 210 may have a unidirectional mode and a bi-directional mode. In the unidirectional mode, the PLD 210 may forward the signal received from the PTP switch 100 (e.g., second synchronization message) to the receiving server 30 at run-time, and the signal from the receiving server 30 to the PTP switch 100 cannot pass through the PLD 210. In the bi-directional mode, the PLD 210 may forward the signal received from the PTP switch 100 to the receiving server 30, and may forward the signal received from the receiving server 30 to the PTP switch 100.

Figure 6:
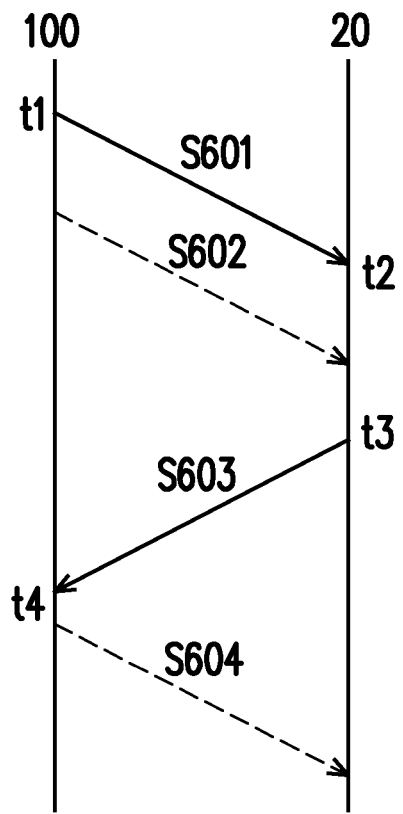
FIG. 6 illustrates a schematic diagram of the time synchronization process according to an embodiment of the disclosure.

A time synchronization process may be performed between the PLD 210 and the transmitting server 20. FIG. 6 illustrates a schematic diagram of the time synchronization process according to an embodiment of the disclosure. In response to performing the time synchronization process, in step S601, the PTP switch 100 may transmit a synchronization message (i.e., second synchronization message mentioned above) to the transmitting server 20 at time point t1. The transmitting server 20 may receive the synchronization message at time point t2. In step S602, after the synchronization message being transmitted, the PTP switch 100 may transmit a follow up message to the transmitting server 20, wherein the follow up message may include information of the time point t1. After the step S602 is completed, the information of the time point t1 and the time point t2 may be known to the transmitting server 20.

In step S603, the transmitting server 20 may transmit a delay request message to the PTP switch 100 at time point t3. The PTP switch 100 may receive the delay request message at time point t4. In step S604, the PTP switch 100 may transmit a delay response message to the transmitting server 20, wherein the delay response message may include information of the time point t4. After the step S604 is completed, the information of the time point t1, t2, t3, and t4 may be known to the transmitting server 20. The transmitting server 20 may calculate a time offset and a transmit time between the PTP switch 100 and the transmitting server 20 according to formula (1) and formula (2). The transmitting server 20 may synchronize with the PTP switch 100 according to the time offset and the transmit time derived by the formula (1) and formula (2) respectively. After the time synchronization process between the transmitting server 20 and the PTP switch 100 is completed, the transmitting server 20 may generates a timestamp according to the result of the time synchronization process. In other words, the transmitting server 20 may generate the timestamp according to the second synchronization message received from the PTP switch 100.

$$\text{Time Offset}=\tfrac{1}{2}*(t2-t1-t4+t3) \quad (1)$$

$$\text{Transmit Time}=\tfrac{1}{2}*(t2-t1+t4-t3) \quad (2)$$

Similarly, the PTP switch 100 may communicates with the receiving server 30 so as to perform the time synchronization process with the receiving server 30 according to the second synchronization message. The PLD 210 may turn into the bi-directional mode in response to a time synchronization process between the PTP switch 100 and the receiving server 30 are performing. In the bi-directional mode, the PTP switch 100 may communicate with the receiving server 30 for performing the time synchronization process via the PLD 210. The receiving server 30 may obtain a time offset and a transmit time from the time synchronization process. The receiving server 30 may synchronize with the PTP switch 100 according to the time offset and the transmit time. After the time synchronization process between the PTP switch 100 and the receiving server 30 is completed, the receiving server 30 may determine whether the timestamp received from the PTP switch 100 is correct according to the result of the time synchronization process. In other words, the receiving server 30 may determine whether the timestamp received from the PTP switch 100 is correct according to the second synchronization message.

It should be noted that the time synchronization process between the receiving server 30 and the other device should be completed off-line. The is, the time synchronization process should be completed before an external device starting to communicate with the communication system 10. Therefore, no needless information from the external device will be transmitted to the receiving server 30 through the PLD 210 when the PLD 210 turns into the bi-directional mode.

Similarly, the PTP switch 100 may communicates with the PLD 210 so as to perform the time synchronization process with the PLD 210 according to the second synchronization message. The PLD 210 may obtain a time offset and a transmit time from the time synchronization process. The PLD 210 may synchronize with the PTP switch 100 according to the time offset and the transmit time. After the time synchronization process between the PTP switch 100 and the PLD 210 is completed, the PLD 210 may determine whether the timestamp received from the PTP switch 100 is correct according to the result of the time synchronization process. In other words, the PLD 210 may determine whether the timestamp received from the PTP switch 100 is correct according to the second synchronization message.

After a time synchronization process between a first component of the communication system 10 and the PTP switch is completed and a time synchronization process between a second component of the communication system 10 and the PTP switch is completed, the first component may be synchronized with the second component. That is, the time offset and the transmit time between the first component and the second component may be obtained by the first component (or obtained by the second component). In other words, time synchronization among the components of the communication system 10 can be achieved. For example, if the time synchronization process between the transmitting server 20 and the PTP switch 100, the time synchronization process between the PLD 210 and the PTP switch 100, and the time synchronization process between the receiving server 30 and the PTP switch 100 are completed. The transmitting server 20, the PLD 210, and the receiving server 30 may be synchronized with each other. The multiple components of the communication system 10 may be connected to each other via cables. Therefore, after the time synchronization process between two components is completed, there is no need to compute the transmit time between the two components again since the length of the cables may be fixed to ensure that the transmit time is always the same. In one embodiment, the components of the communication system 10 may be synchronized according to PTP or IEEE 1588 protocol.

The transmitting server 20 may receive a signal corresponding to a first protocol and obtain data from the signal. In one embodiment, the received signal may be corresponded to a bi-directional protocol such as transmission control protocol (TCP). In one embodiment, the received signal may be corresponded to a unidirectional protocol such as user datagram protocol (UDP), real time transport protocol (RTP), simple network management protocol (SNMP), routing information protocol (RIP), or domain name server (DNS) lookup. After the data is obtained, the transmitting server 20 may pack the data to generate at least one data packet corresponding to a second protocol, and may transmit the at least one data packet and a timestamp to the PTP switch 100, wherein the second protocol may be corresponded to a unidirectional protocol.

Figure 7:
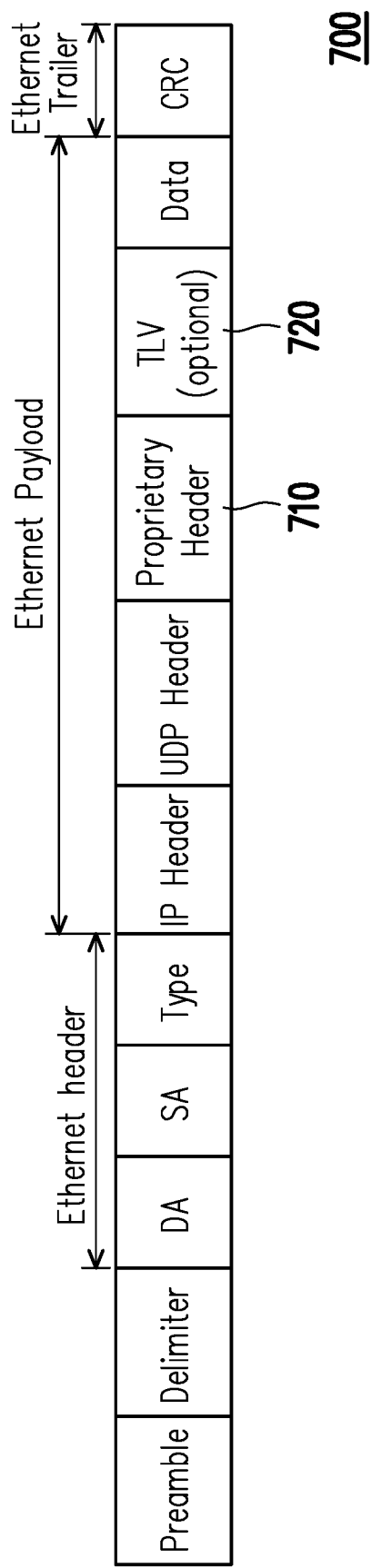
FIG. 7 illustrates a schematic diagram of the packet format according to an embodiment of the disclosure.

The at least one data packet may be packed in packet format 700 as shown in FIG. 7. FIG. 7 illustrates a schematic diagram of the packet format 700 according to an embodiment of the disclosure. The packet format 700 may be corresponded to an Ethernet packet format such as UDP, wherein field "DA" may include a destination address, field "SA" may include a source address, field "Type" may include an Ether type (e.g., 0080 for IP packet), and field "CRC" may include a cyclic redundancy check (CRC) code. A proprietary header 710 may be configured in the payload of the packet format 700, wherein the proprietary header 710 may include a synchronization word, an encryption method (e.g., AES encryption), a Hash method (or data signature method such as XOR or SHA . . . ), a system time stamp, a total size of the data corresponding to the at least one data packet (i.e., total size of session), a data size of the at least one data packet (i.e., packet size), a sequence number of the at least one data packet (i.e., sequence number of session), and a checksum of the proprietary header 710. Table 1 is an example of a proprietary header of a data packet packed by the transmitting server 20. The payload data may be encrypted according to information from the proprietary header 710 with the key generated by the permutation of the hash function of the proprietary header 710. A system time stamp with precision on micro-second guarantees that the same data in different times be encrypted to different encrypted data respectively. That is, each packet may have its own dedicated key for the data encryption. The transmitting server 20 may encode the at least one packet according to, for example, the encryption method or the Hash method recited in the proprietary header 710. Accordingly, the receiving server 30 may decode the at least one packet according to, for example, the encryption method or the Hash method recited in the proprietary header 710.

TABLE 1

Synchronization Word

System Time Stamp (micro-second)
Encryption Method
Hash Method
Total size of Session
Sequence Number of Session
Packet Size
Checksum The checksum of the proprietary header 710 can be determined according to all data except the checksum itself in the proprietary header 710. Since the proprietary header of a specific data packet is always different to the proprietary header of another data packet, the checksum of the specific data packet is always different to the checksum of the another data packet.

In one embodiment, the packet format 700 of the at least one data packet may further include a type-length-value (TLV) frame 720. The TLV frame 720 may store a Hash value corresponding to the Hash method in the proprietary header 710, and may store a destination file name of a file corresponding to the at least one data packet.

The PTP switch 100 may receive the at least one data packet and the timestamp from the transmitting server 20, and may forward the at least one data packet and the timestamp to the PLD 210. After receiving the at least one data packet and the timestamp from the PTP switch 100, the PLD 210 may filter the at least one data packet and/or the timestamp according to the filtering rule 211 in the unidirectional mode. Specifically, the PLD 210 may determine whether to output the at least one data packet and/or the timestamp to the receiving server 30 via the communication interface 240 according to the filtering rule 211 and at least one of the proprietary header 710 and the timestamp, wherein the filtering rule 211 may be associated with the at least one of the proprietary header 710 and the timestamp.

In one embodiment, the filtering rule 211 may be associated with the timestamp. That is, since the PLD 210 may be synchronized with the PTP switch 100, the PLD 210 may determine whether to output the at least one data packet and/or the timestamp by checking the timestamp. For example, after a time synchronization process between the PTP switch 100 and the PLD 210 is completed and a time synchronization process between the PTP switch 100 and the transmitting server 20 is completed, the PLD 210 may know the time offset and the transmit time between the transmitting server 20 and the PLD 210. The PLD 210 may check whether the timestamp is matched with the time offset and the transmit time according to the filtering rule 211. If the timestamp is not matched with the time offset and the transmit time, the PLD 210 may assume that the at least one data packet and the timestamp was transmitted to the one-way link circuit 200 by a device other than the transmitting server 20. The PLD 210 may thus determine not to output the at least one data packet and/or the timestamp to the receiving server 30. Otherwise, if the timestamp is matched with the time offset and the transmit time, the PLD 210 may determine to output the at least one data packet and/or the timestamp.

In one embodiment, the filtering rule 211 may be associated with the proprietary header 710 (or the packet format 700). The PLD 210 may determine whether to output the at least one data packet and/or the timestamp according to the proprietary header 710 (or the packet format 700) and the filtering rule 211. The PLD 210 may determine whether to output the at least one data packet and/or the timestamp by at least checking the synchronization word and the checksum of the proprietary header 710. If the synchronization word is matched with the filtering rule 211 and the checksum is matched with the other fields of the proprietary header 710 (e.g., all data in Table 1 except the checksum itself), the PLD 210 may determine to output the at least one data packet and/or the timestamp. If at least one of the synchronization word or the checksum is not correct, the PLD 210 may determine not to output the at least one data packet and the timestamp to the receiving server 30.

If the PLD 210 determines not to output the at least one data packet and the timestamp to the receiving server 30, the PLD 210 may drop the at least one data packet and the timestamp or the PLD 210 may transmit the at least one data packet and the timestamp to the storage device 400 (or to an external device) via the communication interface 230. The storage device 400 may store the at least one data packet and the timestamp received from the PLD 210 for user reference. The aforementioned external device may be, for example, a diagnosis server. The PLD 210 may transmit the at least one data packet to the external device such that the external device may analyze where the mis matched packets comes from or goes to.

In one embodiment, the PLD 210 may obtain the filtering rule 211 from the PTP switch 100. Specifically, the processor 110 of the PTP switch 100 may transmit the filtering rule 211 to the PLD 210 via a message corresponding to a public key via the communication interface 150. For example, the processor 110 may generate the message carrying the filtering rule 211 according to the public key. The filtering rule 211 may be defined by the user according to the requirements of the user.

The PLD 210 may receive the message carrying the filtering rule 211 from the PTP switch 100 via the communication interface 220. After the message being received, TPM 212 may decode the message so as to obtain the filtering rule 211 from the message. TPM 212 may decode the message according to a private key corresponding to the public key. The public key and the private key may be pre-stored in the PTP switch 100 and the PLD 210 respectively.

If the PLD 210 determines to output the at least one data packet and the timestamp to the receiving server 30, the receiving server 30 may receive the at least one data packet and the timestamp from the PLD 210 via the communication interface 33. The receiving server 30 may determine whether the at least one data packet is abnormal according to at least one of the proprietary header 710 and the timestamp.

In one embodiment, the receiving server 30 may determine whether the at least one data packet is abnormal according to the timestamp. Since the receiving server 30 may be synchronized with the PTP switch 100 (or the PLD 210), the receiving server 30 may determine whether the at least one data packet is abnormal by checking the timestamp. Take PTP switch 100 and the receiving server 30 for an example, after a time synchronization process between the PTP switch 100 and the receiving server 30 is completed and a time synchronization process between the PTP switch 100 and the transmitting server 20 is completed, the receiving server 30 may know the time offset and the transmit time between the transmitting server 20 and the receiving server 30. The receiving server 30 may check whether the timestamp is matched with the time offset and the transmit time.

If the timestamp is not matched with the time offset and the transmit time, the receiving server 30 may assume that the at least one data packet and the timestamp was transmitted to the receiving server 30 by a device other than the transmitting server 20. The receiving server 30 may thus determine that the at least one data packet is abnormal. Otherwise, if the timestamp is matched with the time offset and the transmit time, the receiving server 30 may determine that the at least one data packet is normal.

In one embodiment, the receiving server 30 may determine whether the at least one data packet is abnormal according to the header 710 (or the packet format 700). The receiving server 30 may determine whether the at least one data packet is abnormal by at least checking the synchronization word and the checksum of the proprietary header 710. If the synchronization word is correct (e.g., matched with the information pre-stored in the receiving server 30) and the checksum is matched with the other fields of the proprietary header 710 (e.g., all data in Table 1 except the checksum itself), the receiving server 30 may determine that the at least one data packet is normal. If the at least one of the synchronization word or the checksum is not correct, the receiving server 30 may determine that the at least one data packet is abnormal.

If the receiving server 30 determines that the at least one data packet received from the one-way link circuit 200 is abnormal, the receiving server 30 may drop the at least one data packet.

Figure 8:
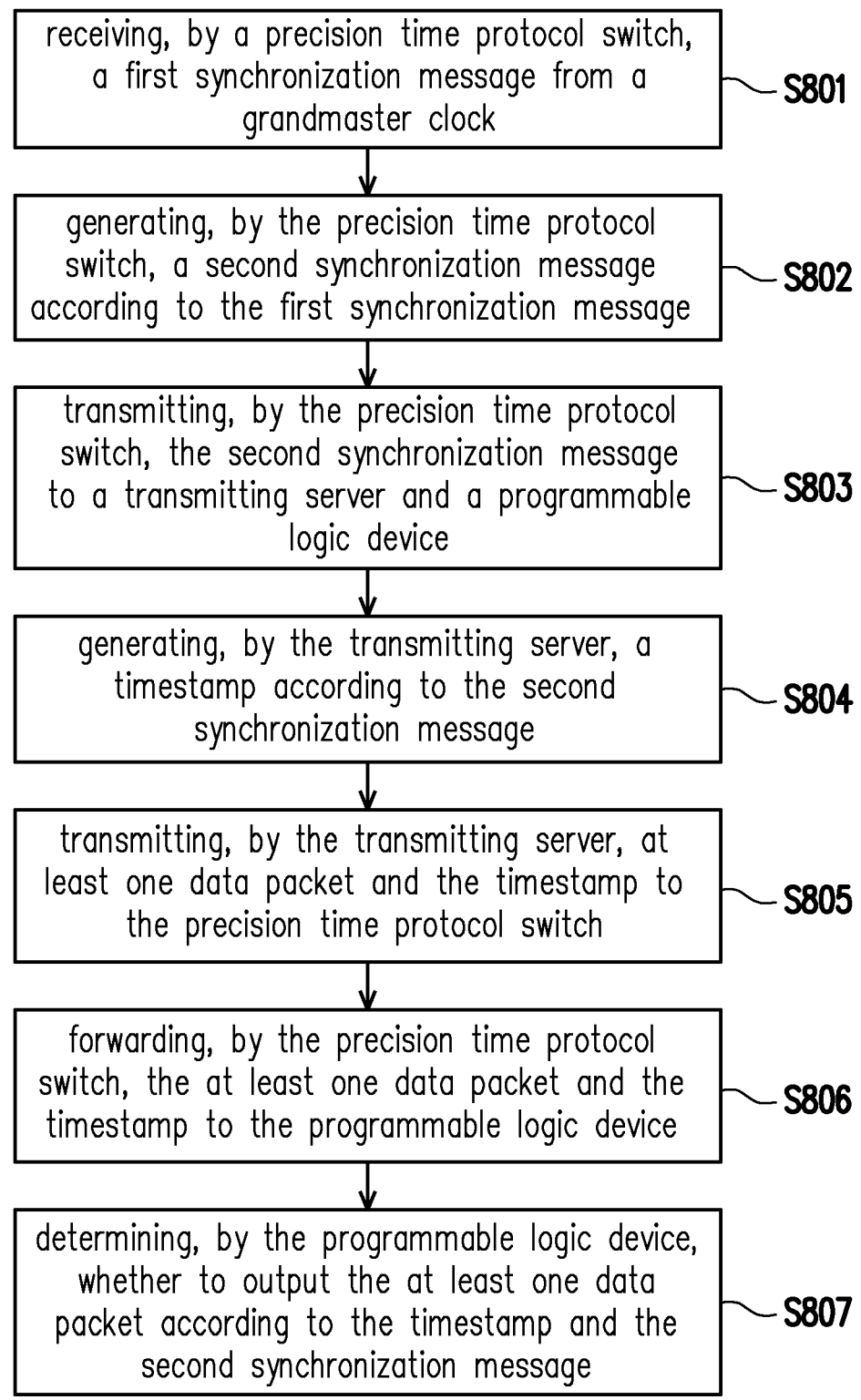
FIG. 8 illustrates a flowchart of the communication method for one-way transmission according to an embodiment of the disclosure.

FIG. 8 illustrates a flowchart of the communication method for one-way transmission according to an embodiment of the disclosure, wherein the communication method may be implemented by the communication system 10 as shown in FIG. 1. In step S801, receiving, by a precision time protocol switch, a first synchronization message from a grandmaster clock. In step S802, generating, by the precision time protocol switch, a second synchronization message according to the first synchronization message. In step S803, transmitting, by the precision time protocol switch, the second synchronization message to a transmitting server and a programmable logic device. In step S804, generating, by the transmitting server, a timestamp according to the second synchronization message. In step S805, transmitting, by the transmitting server, at least one data packet and the timestamp to the precision time protocol switch. In step S806, forwarding, by the precision time protocol switch, the at least one data packet and the timestamp to the programmable logic device. In step S807, determining, by the programmable logic device, whether to output the at least one data packet according to the timestamp and the second synchronization message.

In summary, the present disclosure may prevent needless information from being sent to the unsecure site by implementing the one-way transmission channel between the secure site and the unsecure site based on a programmable logic device such as FPGA. The communication system may perform time synchronization process for the transmitting server, the one-way link circuit, and the receiving server. The programmable logic device may filter data packets sent from the secure site to the unsecure site according to a filtering rule associated with a timestamp. Therefore, an obsolete data packet which may be a sniffer packet cannot be sent to the unsecure site via the one-way transmission channel.

No element, act, or instruction used in the detailed description of disclosed embodiments of the present application should be construed as absolutely critical or essential to the present disclosure unless explicitly described as such.

Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication system for one-way transmission, comprising:
   a one-way link circuit comprising a programmable logic device having a unidirectional mode and a bi-directional mode;
   a grandmaster clock;
   a transmitting server;
   a receiving server coupled to the one-way link circuit; and
   a precision time protocol switch coupled to the one-way link circuit, the grandmaster clock, and the transmitting server, wherein
   the precision time protocol switch receives a first synchronization message from the grandmaster clock, generates a second synchronization message according to the first synchronization message, and transmits the second synchronization message to the transmitting server and the programmable logic device;
   the transmitting server generates a timestamp according to the second synchronization message and transmits at least one data packet and the timestamp to the precision time protocol switch;
   the precision time protocol switch forwards the at least one data packet and the timestamp to the programmable logic device;
   the programmable logic device determines whether to output the at least one data packet according to the timestamp and the second synchronization message;
   the receiving server receives the second synchronization message from the programmable logic device;
   the receiving server communicates, via the programmable logic device in the bi-directional mode, with the precision time protocol switch for performing a first time synchronization process according to the second synchronization message; and
   the receiving server receives the at least one data packet from the programmable logic device in the unidirectional mode.

2. The communication system according to claim 1, wherein
   the programmable logic device determines whether to output the at least one data packet according to the timestamp and the second synchronization message based on a filtering rule.

3. The communication system according to claim 2, further comprising:
a storage device coupled to the one-way link circuit, wherein the programable logic device transmits the at least one data packet to the storage device in response to determining not to output the at least one data packet.

4. The communication system according to claim 2, wherein the programmable logic device performs a second time synchronization process with the precision time protocol switch according to the second synchronization message.

5. The communication system according to claim 4, wherein the programmable logic device obtains a time offset from the second time synchronization process and determines whether to output the at least one data packet according to the time offset and the timestamp.

6. The communication system according to claim 2, wherein a packet format of the at least one data packet comprises a proprietary header, and the proprietary header comprises a synchronization word and a checksum of the proprietary header, wherein
the programmable logic device determines whether to output the at least one data packet according to the timestamp and the proprietary header.

7. The communication system according to claim 6, wherein the packet format is an Ethernet packet format.

8. The communication system according to claim 7, wherein the packet format further comprising:
a type-length-value frame storing at least one of a Hash value corresponding to the Hash method and a destination file name of a file corresponding to the at least one data packet.

9. The communication system according to claim 1, wherein the receiving server receives the timestamp from the programmable logic device, wherein the receiving server determines whether the at least one data packet is abnormal according to the timestamp and the second synchronization message.

10. The communication system according to claim 9, wherein a packet format of the at least one data packet comprises a proprietary header, and the proprietary header comprises a synchronization word and a checksum of the proprietary header, wherein
the receiving server determines whether the at least one data packet is abnormal according to the timestamp and the proprietary header.

11. The communication system according to claim 1, wherein the receiving server obtains a time offset from the first time synchronization process and determines whether the at least one data packet is abnormal according to the time offset and the timestamp.

12. The communication system according to claim 1, wherein the transmitting server is configured to:
receive a signal corresponding to a first protocol and obtains data from the signal; and
pack the data to generate the at least one data packet corresponding to a second protocol.

13. The communication system according to claim 12, wherein the first protocol is a bi-directional protocol and the second protocol is a unidirectional protocol.

14. A communication method for one-way transmission, comprising:
receiving, by a precision time protocol switch, a first synchronization message from a grandmaster clock;
generating, by the precision time protocol switch, a second synchronization message according to the first synchronization message;
transmitting, by the precision time protocol switch, the second synchronization message to a transmitting server and a programmable logic device, wherein the programmable logic device has a bi-directional mode and a unidirectional mode;
generating, by the transmitting server, a timestamp according to the second synchronization message;
transmitting, by the transmitting server, at least one data packet and the timestamp to the precision time protocol switch;
forwarding, by the precision time protocol switch, the at least one data packet and the timestamp to the programmable logic device;
determining, by the programmable logic device, whether to output the at least one data packet according to the timestamp and the second synchronization message;
receiving, by a receiving server, the second synchronization message from the programmable logic device;
communicating, by the receiving server via the programmable logic device in the bi-directional mode, the precision time protocol switch time synchronization process according to the second synchronization message; and
receiving, from the programmable logic device in the unidirectional mode, the at least one data packet.

\* \* \* \* \*